United States Patent [19]
Jayakumar et al.

[11] Patent Number: 6,021,458
[45] Date of Patent: Feb. 1, 2000

[54] METHOD AND APPARATUS FOR HANDLING MULTIPLE LEVEL-TRIGGERED AND EDGE-TRIGGERED INTERRUPTS

[75] Inventors: Muthurajan Jayakumar, Sunnyvale; Vijay Kumar Goru, San Jose, both of Calif.

[73] Assignee: Intel Corporation, Santa Clara, Calif.

[21] Appl. No.: 09/010,226

[22] Filed: Jan. 21, 1998

[51] Int. Cl.[7] ................................................ G06F 9/46
[52] U.S. Cl. .................................... 710/266; 710/269
[58] Field of Search .................................. 710/263, 264, 710/266, 269, 48, 49, 50

[56] References Cited

U.S. PATENT DOCUMENTS

| | | | |
|---|---|---|---|
| 5,261,107 | 11/1993 | Klim et al. ............................... | 710/266 |
| 5,555,413 | 9/1996 | Lohman et al. ......................... | 710/260 |
| 5,603,035 | 2/1997 | Erramoun et al. ...................... | 710/264 |
| 5,642,516 | 6/1997 | Hedayat et al. ......................... | 710/264 |
| 5,784,271 | 7/1998 | Nagasaki ................................. | 710/264 |

FOREIGN PATENT DOCUMENTS

PCT/US99/
01162  1/1999  WIPO .

Primary Examiner—Glenn A. Auve
Attorney, Agent, or Firm—Blakely, Sokoloff, Taylor & Zafman LLP

[57] ABSTRACT

Methods and apparatus are disclosed for determining whether the highest priority pending interrupt is an active level-triggered interrupt. One method includes: determining whether the vector corresponding to the highest priority pending interrupt matches the vector associated with a particular interrupt input; if it does, determining whether that particular interrupt input is programmed to be a level-triggered interrupt; if it is, determining whether the level-status of that particular interrupt input is active; and, if it is, sending a level-triggered active message for the highest priority pending interrupt, by maintaining the set status of a particular bit. One embodiment of the present invention includes an interrupt service register operable to indicate when an interrupt is being serviced, an interrupt request register operable to indicate when an interrupt is pending, and a comparator operable to compare the vector corresponding to the highest priority pending interrupt with the vector associated with the particular interrupt input. Included also is a control generator coupled to the comparator, and operable to selectively clear and/or set bits contained in the interrupt service register and in the interrupt request register. The present invention supports both edge-triggered and level-triggered interrupts, without the need for a trigger mode register or other similar overhead house-keeping controls and related storage logic, and without any hand-shake requirements.

21 Claims, 5 Drawing Sheets

METHOD AND APPARATUS FOR HANDLING MULTIPLE LEVEL-TRIGGERED AND EDGE-TRIGGERED INTERRUPTS

BACKGROUND OF THE INVENTION

1. Field of the Invention

This invention relates generally to computers. More particularly, it relates to interrupt controllers for controlling interrupts in a computer.

2. Description of the Related Art

A computer is a machine that essentially does three things. First, it accepts input. Second, it processes the input according to a prescribed set of rules. Third, it produces as output the results of processing the input according to the prescribed set of rules.

To perform these tasks, a computer, in general, includes: an input device, such as a keyboard, that accepts input; and output device, such as a printer or video display, that outputs the results; and a processor, such as a central processing unit (CPU), that does the processing. In present-day personal computers, the CPU might be a microprocessor. Additionally, the computer might have memory. Such memory might be used by the processor to store data. Or the memory might be used to store computer instructions, which instructions were put into the memory in the form of microcode.

While the computer is operating and the processor is processing the input previously received by the computer according to the prescribed set of rules, the processor might receive a request for attention. For example, the processor might receive a request from the keyboard to accept new input. Such a request for attention is called an interrupt.

In general, when the processor receives an interrupt it suspends its current operations, saves the status of its work, and transfers control to a special routine which contains the instructions for dealing with the particular situation that caused the interrupt. Interrupts might be generated by various hardware devices to request service or to report problems, or by the processor itself in response to program errors or requests for operating system services. Interrupts are the processor's way of communicating with the other elements that make up the computer system. A hierarchy of interrupt priorities determines which interrupt request will be handled first, if more than one request has been made. Particular programs can temporarily disable some interrupts, when the program needs the full attention of the processor to complete a particular task.

In general, an interrupt can be considered a feature of a computer that permits the execution of one program to be interrupted in order to execute another program. That other program might be a special program that is executed when a specific interrupt occurs, sometimes called an interrupt handler. Interrupts from different causes have different handlers to carry out the corresponding tasks, such as updating the system clock or reading the keyboard. A table stored in memory contains pointers, sometimes called address vectors, that direct the processor to the various interrupt handlers. Programmers can create interrupt handlers to replace or supplement existing handlers. Alternatively, that other program might be one that takes place only when requested by means of an interrupt, sometimes called an interrupt-driven process. After the required task has been completed, the CPU is then free to perform other tasks until the next interrupt occurs. Interrupt driven processors sometimes are used to respond to such events as a floppy-disk drive having become ready to transfer data.

In general, computers include a hardware line, sometimes called an interrupt request line, over which devices such as a keyboard or a disk drive can send interrupts to the CPU. Such interrupt request lines are built into the computer's internal hardware, and are assigned different levels of priority so that the CPU can determine the sources and relative importance of incoming service requests.

The manner in which a particular computer deals with interrupts, is determined by the computer's interrupt controller. Each interrupt has a characteristic that permits the interrupt controller to recognize it as an interrupt. One such characteristic is the interrupt's trigger mode. In general, there are two trigger modes, edge-triggered and level-triggered. For an edge-triggered interrupt, the interrupt controller recognizes a positive-going edge of a signal from an interrupt source as a valid interrupt request; for a level-triggered interrupt, the interrupt controller recognizes a static high-level of a signal from an interrupt source as a valid interrupt request.

In certain sophisticated modern microprocessors, such as the PentiumPRO™ microprocessor manufactured by Intel, an advanced programmable interrupt controller is included. The advanced programmable interrupt controller of this prior art processor, referred to as APIC, includes an APIC Input/Output (I/O) module that receives system interrupt requests from I/O devices, and routes them to the local APIC modules that are contained in the processor. A three-wire APIC bus connects all of these devices together. The APIC bus carries messages between the APIC I/O module and the local APIC modules contained in the processor. Each processor also has two local interrupt pins, called LINT0 and LINT1, for devices connected externally to the local processor.

When the prior art APIC I/O module sends an interrupt request over the APIC bus, all local APIC modules evaluate the information transferred over the APIC bus. The local APIC module that is being targeted recognizes, accepts, and services the interrupt request.

When the interrupt is accepted in this prior art device, the bit in a trigger mode register corresponding to the interrupt's vector number is made to reflect whether the interrupt is an edge-triggered interrupt or a level-triggered interrupt. The trigger mode register in this prior art device is a 256-bit register, and is used to keep track of the trigger mode of each interrupt. The software programmer may program the interrupt controller's internal registers to recognize either an edge-triggered interrupt or a level-triggered interrupt for each interrupt source.

Edge-triggered interrupt inputs support only a single interrupt source device being connected to a given interrupt input to the I/O APIC. When an interrupt is triggered, the prior art I/O APIC sends an interrupt request over the APIC bus. After the interrupt request is delivered, the I/O APIC automatically clears its interrupt pending bit and is ready to recognize another edge-triggered interrupt from the same interrupt source.

During the interrupt service routine, the programmer of this prior art device clears the interrupt pending bit within the interrupt source device. This notifies the device that the current interrupt is being serviced, and that another interrupt request can be issued. At the end of the interrupt service routine, the programmer performs an end of interrupt command by writing all zero's to the local APIC's end of interrupt register, thereby enabling other pending interrupts to be serviced. This causes the highest-priority interrupt request in the local interrupt service register to be cleared, preventing it from being serviced again.

Level-triggered interrupts permit more than one interrupt source device to share a single interrupt line. When an end of interrupt command is performed by a level-triggered interrupt service routine, the prior art local APIC must broadcast an end of interrupt message to the I/O APIC. The end of interrupt message contains the vector of the level-triggered interrupt just serviced. If the interrupt input corresponding to the end of interrupt vector is still asserted, the I/O APIC recognizes that another device that shares the same interrupt line is requesting service, and transfers another interrupt request over the APIC bus. The I/O APIC cannot detect whether the interrupt input remains asserted because the device that triggered the initial request has yet to be serviced, or because another device is asserting an interrupt request. Consequently, interrupt servicing continues until at some point in time the level on the interrupt line goes inactive and the I/O APIC sends a de-assert message that clears the interrupt pending condition.

The 256-bit trigger mode register of this prior art device keeps track of, and identifies if, a pending interrupt is edge-triggered or level-triggered. An edge-triggered interrupt implies one interrupt invocation per a particular polarity edge; a level-triggered interrupt implies continuous interrupt invocation as long as the static level is present, and thus there may be more than one interrupt invocation.

In processors more advanced and faster than the PentiumPRO™, the above scheme in which the APIC must broadcast a de-assert message would result in multiple ghost interrupts, because of the long time it would take for the clear message to go through the various system interface buffers of the microprocessor.

The present invention provides a streamline advanced programmable interrupt controller (SAPIC) that eliminates the need for a trigger mode register. In the present invention, software is responsible in level-triggered interrupt processing to communicate with the input/output system. Thus the knowledge of whether an interrupt is edge-triggered or level-triggered is not needed in hardware. As a result, the portion of the chip formally devoted to a trigger mode register can be used to implement more intelligent logic, thereby giving the chip maker a greater return on investment, and permitting the system to operate at a high speed without the problem of multiple ghost interrupts.

SUMMARY OF THE INVENTION

In one aspect of the present invention, a method is provided for determining whether the highest priority pending interrupt needing service is an active level-triggered interrupt. The method includes determining whether the vector corresponding to the highest priority pending interrupt matches the vector associated with a particular interrupt input; if it does, determining whether the vector associated with that particular interrupt input is programmed to be a level-triggered input; if it is, determining whether the level status of that particular interrupt input is active; and, if it is, sending a level-triggered active message for the highest priority pending interrupt.

In another aspect of the present invention, a method is provided for determining whether a level-triggered interrupt is active, after an interrupt has been serviced. The method includes determining whether the vector corresponding to the interrupt that has just been serviced matches the vector associated with a pending interrupt; if it does, determining whether the pending interrupt is programmed to be a level-triggered interrupt; if it is, determining whether the pending interrupt's level-status is active; and, if it is, sending a level-triggered active message for the pending interrupt.

According to yet another aspect of the present invention, apparatus includes an interrupt service register operable to indicate when an interrupt is being serviced, and an interrupt request register operable to indicate when an interrupt is pending. Each of these registers is a multi-bit register. Included also is a comparator, operable to compare the vector corresponding to the highest priority pending interrupt with the vector associated with a particular pending interrupt input. The comparator is coupled to a control generator. The control generator is operable to selectively clear or set the interrupt service register bit associated with the highest priority pending interrupt, and to selectively leave set or clear the interrupt request register bit associated with the highest priority pending interrupt.

The present invention supports both edge-triggered and level-triggered interrupts, without the overhead of housekeeping controls and storage logic for such controls, and without requiring any hand-shake operations. These and other benefits will become evident as the present invention is described more fully below.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
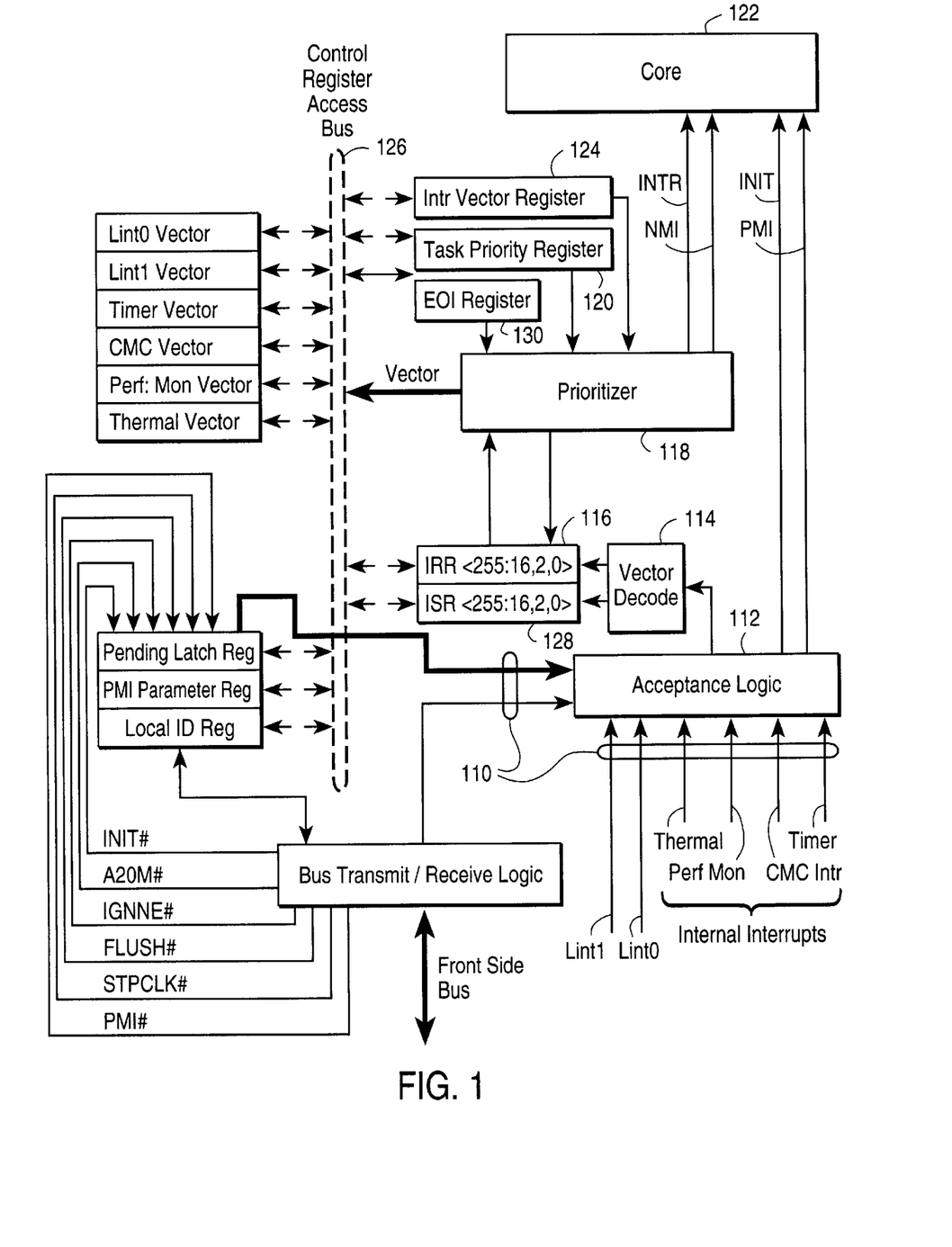
FIG. 1 is a schematic block diagram of a programmable interrupt controller according to the present invention.

Referring now to the drawings, and in particular to FIG. 1, there is shown in block diagram form the basic internal structure of a programmable interrupt controller according to one aspect of the present invention. Interrupts 110 from different sources are received by the programmable interrupt controller, are prioritized, and are then dispatched to the CPU core. Each interrupt is received by acceptance logic 112. The acceptance logic looks at the interrupt, and schedules it if it satisfies basic interrupt criteria, such as masking, etc. The interrupt is then decoded by a vector decoder 114, and then assigned to a particular location in Interrupt Request Register (IRR) 116.

By latching a particular interrupt in the Interrupt Request Register (IRR) 116, the programmable interrupt controller registers that interrupt. The interrupt is then sent to a prioritizer 118, where the incoming interrupt is compared to an already existing interrupt and/or to the Task Priority Register (TPR) 120. An indication that an interrupt is awaiting service is sent to the microprocessor core 122.

In response to the indication that an interrupt is awaiting service, programmable software performs a read operation to the Interrupt Vector Register (IVR) 124, via the Control Register Access Bus (CRAB) 126.

The programmable interrupt controller, according to the embodiment illustrated in FIG. 1, responds to this read by placing the vector of the interrupt on the CRAB bus 126. The core 122 receives the vector from the CRAB bus 126, and enters an interrupt service routine based on the vector received.

The read to the Interrupt Vector Register (IVR) 124 causes the interrupt to move from the Interrupt Request Register (IRR) 116 to the Interrupt Service Register (ISR) 128. When the core 122 is done with the interrupt service routine, it writes to the End of Interrupt (EOI) register 130. This results in the programmable interrupt controller throwing away the interrupt contained in the Interrupt Service Register (ISR) 128, returning the Interrupt Service Register back to its initial state.

Thus far, the processing of a single interrupt has been described. In operation, as many as 242 interrupts can be serviced in the illustrated embodiment, providing the operating system allows for multiple-nesting of interrupts. And, there could be as many as 242 pending interrupts.

The interrupts 110 include an interrupt LINT0 and an interrupt LINT1, which are local interrupts associated with a local interrupt pin 0 and a local interrupt pin 1, respectively, in a particular embodiment of the present invention. Devices can be connected to the processor's local interrupt pins, and, via those pins and each pin's associated interrupt line, may provide interrupt requests directly to the local SAPIC.

In one embodiment of the present invention, either of the interrupts LINT0 and LINT1 may be a level-triggered interrupt or an edged-triggered interrupt.

Figure 2:
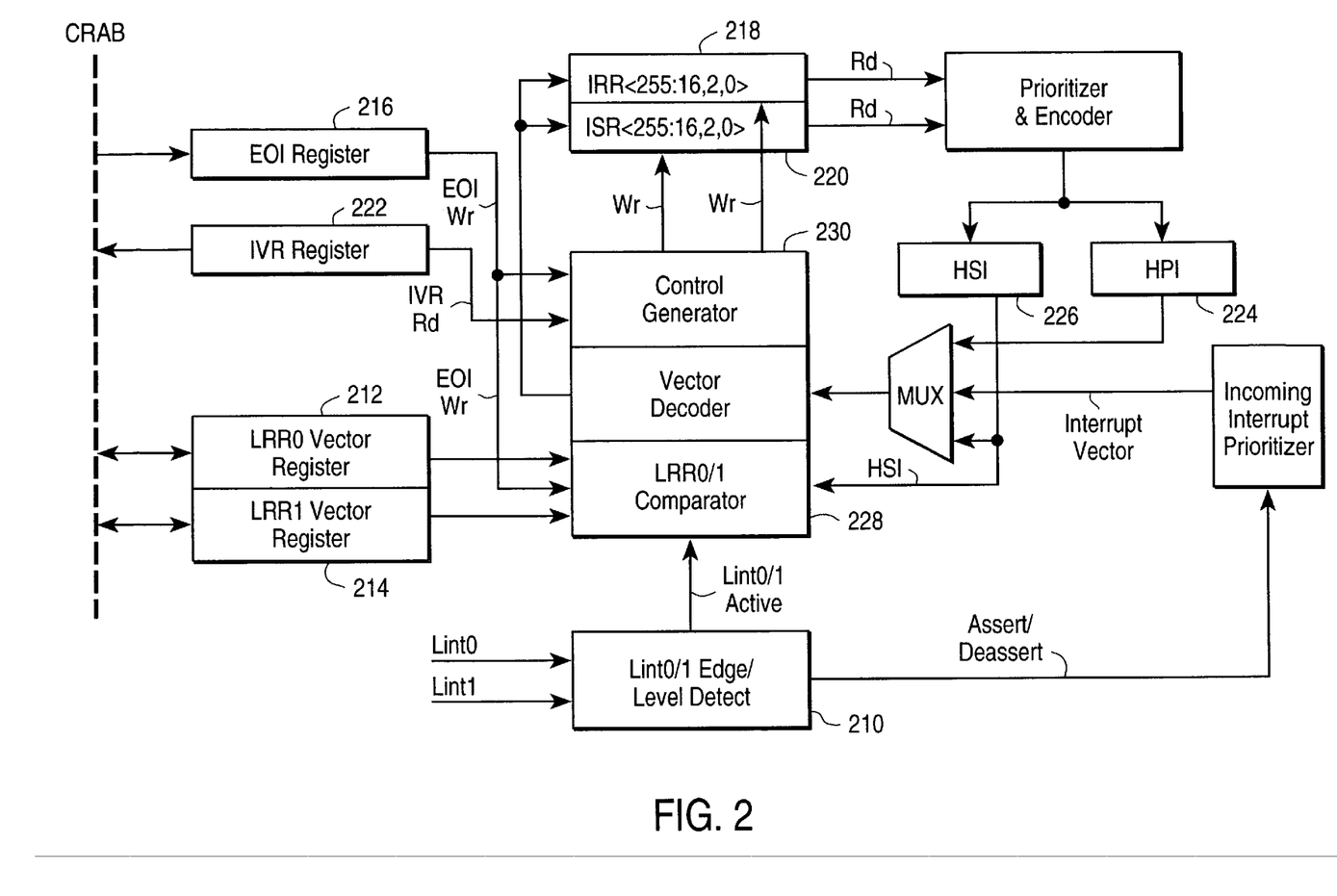
FIGS. 2 and 4 are schematic block diagrams of apparatus for handling level-triggered and edge-triggered interrupts according to two embodiments of the present invention.

Referring now to FIG. 2, the interrupts LINT0 and LINT1 are each received by an edge-level detector 210. This detector determines, for each of the interrupts it receives, whether the interrupt is actively asserting itself as a level-triggered interrupt.

With continued reference to FIG. 2, included are two local redirection registers, LRR0 and LRR1, denoted by reference numerals 212 and 214, respectively. The registers LRR0 and LRR1 receive and store the interrupt vector associated with the local interrupt pins LINT0 and LINT1, respectively. In one embodiment of the present invention, each of the registers 212 and 214 is a 64-bit register. Bits 7-0 are used to store the vector number programmed for a particular interrupt source, and bit 15 is used to store the trigger mode programmed for that particular interrupt source. In one embodiment of the present invention, a zero is contained in bit 15 for an interrupt source programmed to be an edge-triggered interrupt, and a one is contained in bit 15 for an interrupt source programmed to be a level-triggered interrupt.

Other registers shown in the embodiment illustrated in FIG. 2 include an End of Interrupt (EOI) register 216, an Interrupt Request Register (IRR) 218, an Interrupt Service Register (ISR) 220, an Interrupt Vector Register (IVR) 222, a Highest Priority Interrupt Register 224, and a Highest Servicing Interrupt Register 226.

The End of Interrupt (EOI) register is actually a pseudo-register. Upon completion of the interrupt handler routine for the highest priority pending interrupt, software is responsible for performing a write operation to the address of the EOI register to clear a particular bit (in the Interrupt Service Register) associated with the interrupt, as described more fully below. In operation, a write to the End of Interrupt register indicates that the software is ready to accept another interrupt at the same or lower priority level, as determined by the Task Priority Register.

The Interrupt Request Register (IRR) keeps track of the pending interrupts. A pending interrupt is one that has been accepted, but not yet serviced, by the processor. When an interrupt is received, it is registered in the IRR. When the Interrupt Vector Register is read, the interrupt having the highest priority in the IRR is encoded and supplied as the interrupt vector. Once the vector information is forwarded to the processor, the interrupt is moved to the Interrupt Service Register.

The Interrupt Service Register (ISR) keeps track of the interrupts that are currently being serviced by the processor. When the Interrupt Vector Register is read, the highest priority pending interrupt vector will be given to the CPU, and the corresponding ISR bit will be set, as described more fully below. The bit will remain set until the End of Interrupt register is written to by the processor, as described more fully below. The ISR register may have multiple bits set higher priority interrupts are accepted during servicing of a lower priority interrupt. These higher priority interrupts will be nested, and serviced, within servicing of the original interrupt.

The Highest Priority Interrupt Register is used to hold the value of the Highest Priority Interrupt (HPI). The Highest Priority Interrupt (HPI) is the vector number for the highest priority interrupt that has been received and not serviced; the Highest Priority Interrupt (HPI) is sometimes referred to as the highest priority pending interrupt.

The Highest Servicing Interrupt Register keeps track of the priority of the interrupt currently being serviced, and is used to hold the value of the Highest Servicing Interrupt (HSI). The Highest Servicing Interrupt (HSI) is the vector number for the highest priority interrupt being serviced.

In operation of the illustrated embodiment, certain of the interrupts 110 may be level-triggered interrupts (LINT0 and LINT1), and others are edge-triggered interrupts. The interrupt controller illustrated in FIGS. 1 and 2 properly handles each type of interrupt. When an interrupt has been serviced and the End of Interrupt (EOI) register 216 written, the interrupt-pending status is cleared for the interrupt when the interrupt is an edge-triggered interrupt, and may or may not be cleared when the interrupt is a level-triggered interrupt.

For an edge-triggered interrupt, only one interrupt source is connected to a particular interrupt pin, and, consequently, when the interrupt associated with a particular pin has been serviced, all interrupts associated with that particular pin have been serviced. Not so for level-triggered interrupts; for level-triggered interrupts, more than one interrupt source may be connected to a particular interrupt pin, for example, the local interrupt pins associated with LINT0 and LINT1 in the embodiment illustrated in FIGS. 1 and 2. Since more than one interrupt source device may be connected to the same interrupt pin and thus to the same interrupt request line, that line may remain at the high level, indicating that an interrupt is pending, even though servicing for one device connected to that line is completed, because other devices connected to that line may still have their interrupts pending.

Thus although the software treats all interrupts the same with respect to reading the Interrupt Vector Register (IVR) and writing to the End of Interrupt (EOI) register, what actually occurs for an edge-triggered interrupt must be different from what occurs for a level-triggered interrupt.

Figure 3:
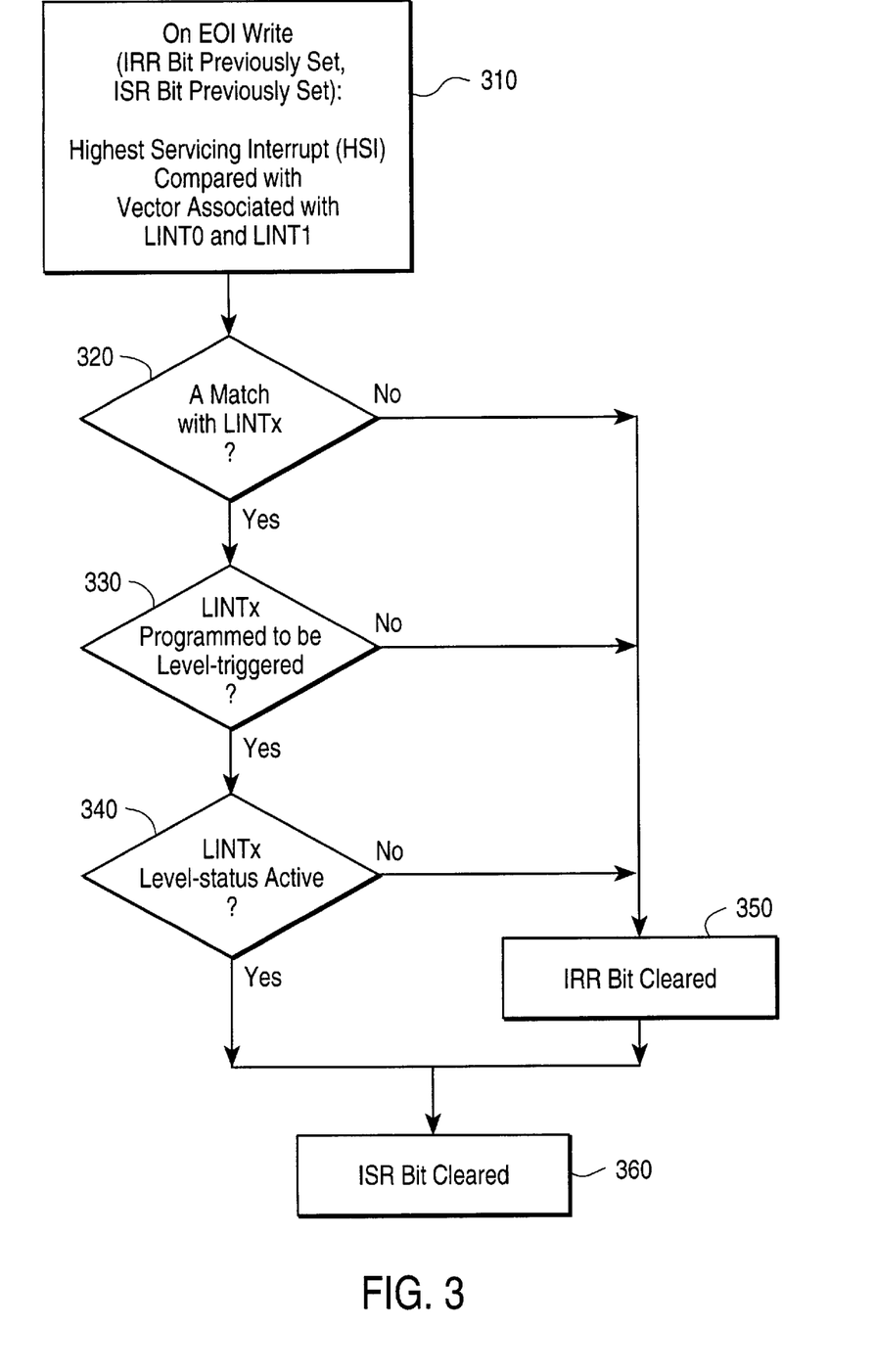
FIGS. 3 and 5 are logic flow charts of methods according to two aspects of the present invention.
Figure 5:
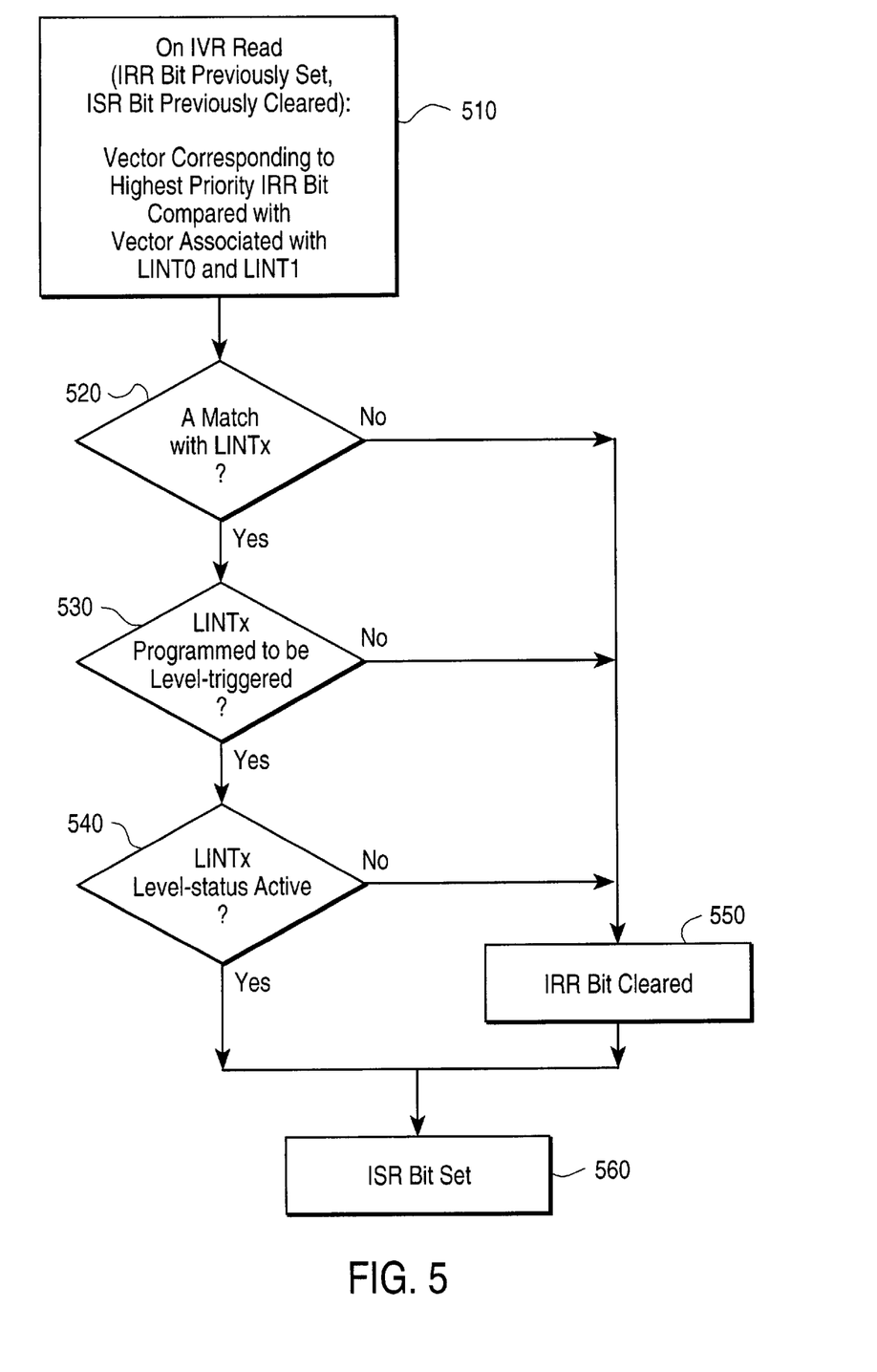

FIG. 3 illustrates certain logic flow on an End of Interrupt (EOI) register write, according to one embodiment of the present invention, and FIG. 5 illustrates certain logic flow on an Interrupt Vector Register (IVR) read, according to another embodiment of the present invention.

Referring first to FIG. 3, the diamond-shaped boxes 320, 330, and 340 are decisions made, and the rectangular boxes 310, 350, and 360 are tasks undertaken, on an EOI write. The interrupt that has just been serviced was the highest-priority interrupt that needed servicing. The bit contained in the Interrupt Service Register (ISR) corresponding to that interrupt had previously been set to indicate it was an interrupt being serviced, the bit corresponding to that interrupt in the Interrupt Request Register (IRR) had previously been set to indicate it was an interrupt source needing service, and the vector number contained in the Highest Servicing Interrupt Register, HSI, is the vector number for that interrupt.

If the interrupt that had just been serviced was on the interrupt line associated with, for example, the local interrupt pin 0, then the IRR bit associated with LINT0 and the ISR bit associated with LINT0 were each previously set. Now that the interrupt has been serviced, the controller must decide whether the IRR bit and/or the ISR bit associated with the interrupt just serviced should be cleared or not. For a level-triggered interrupt associated with, for example, the local interrupt pin 0, these bits should each be cleared if all interrupts associated with that pin have been serviced; but if all such interrupts have not all been serviced, something needs to be done to indicate further servicing is necessary. If, on the other hand, the interrupt was an edge-triggered interrupt, for example, one of the various interrupts 110 illustrated in FIG. 1 other than LINT0 and LINT1, then the bit associated with that interrupt in the Interrupt Request Register (IRR) should be cleared to indicate that the request has been serviced, and the bit associated with that interrupt in the Interrupt Service Register (ISR) should be cleared to indicate that service has been completed. The logic flow illustrated in FIG. 3 accomplishes these tasks efficiently and rapidly.

In the illustrated embodiment, level-triggered interrupts may occur on the interrupt lines associated with LINT0 and LINT1, but not on any other interrupt line. Therefore, according to one embodiment of the present invention, the Highest Servicing Interrupt (HSI) is compared with the vector associated with LINT0, and is also compared with the vector associated with LINT1 (rectangular box 310). The decision of box 320 is then made: Is there a match between HSI and either the vector associated with LINT0 or the vector associated with LINT1? If not, the IRR bit is cleared (rectangular box 350) and the ISR bit is cleared (rectangular box 360).

If, on the other hand, there is a match, for example, with the vector associated with LINT0, then it must be determined whether LINT0 was programmed to be a level-triggered interrupt. This information is contained in bit 15 of the local redirection register for LINT0, that is, in bit 15 of LRR0, the register 212 of FIG. 2. If not, the IRR bit is cleared (rectangular box 350) and the ISR bit is cleared (rectangular box 360).

If LINT0 was programmed to be a level-triggered interrupt, then it must be determined whether the level-status on the interrupt line associated with the LINT0 is active or not-active (diamond-shaped box 340). If the level-status is not-active, then the IRR bit is cleared (rectangular box 350), and the ISR bit is cleared (rectangular box 360). If the level-status is active, then the ISR bit is cleared (rectangular box 360), and the IRR bit is left set.

The LRR0/1 comparator 228 illustrated in FIG. 2, carries out the comparison step of the rectangular box 310 illustrated in FIG. 3. The comparator 228 receives: information about the Highest Servicing Interrupt (HSI) from the register 226 illustrated in FIG. 2, which is the vector number for the interrupt that has just been serviced; input from the registers 212 and 214 regarding the pending interrupts associated with local interrupt pin 0 and with local interrupt pin 1; and input from the detector 210 regarding the level-status of local interrupt pin 0 and of local interrupt pin 1.

The comparator 228, in cooperation with a control generator 230, selectively writes to the Interrupt Request Register (IRR) 218, and to the Interrupt Service Register (ISR) 220 (rectangular boxes 350 and 360, respectively, of FIG. 3), as dictated by the method illustrated in FIG. 3.

Thus, according to this aspect of the present invention, if the Highest Servicing Interrupt (HSI), that is, the interrupt that has just been serviced, has the same vector number as a pending interrupt associated with either LINT0 or LINT1 (which can be found in the LRR0/1 registers), it is considered to be a match. If that matched pending interrupt is programmed to be level-triggered (which can be found in bit 15 of the LRR0/1 registers), and if the pin associated with that matched pending interrupt has a level-status of active, then the Interrupt Request Register (IRR) bit associated with the local interrupt pin having the matching vector is not cleared. It is not cleared even though the Interrupt Service Register (ISR) bit associated with that pin is cleared, thereby indicating a level-triggered interrupt associated with that pin is pending service, even though a level-triggered interrupt associated with that pin has just been serviced.

The logic flow illustrated in FIG. 3 for one embodiment of the present invention, occurs on a write to the End of Interrupt (EOI) register after an interrupt has been serviced. Such logic flow requires access to both the Interrupt Service Register (ISR) and the Interrupt Request Register (IRR) during an End of Interrupt (EOI) register write.

Figure 4:
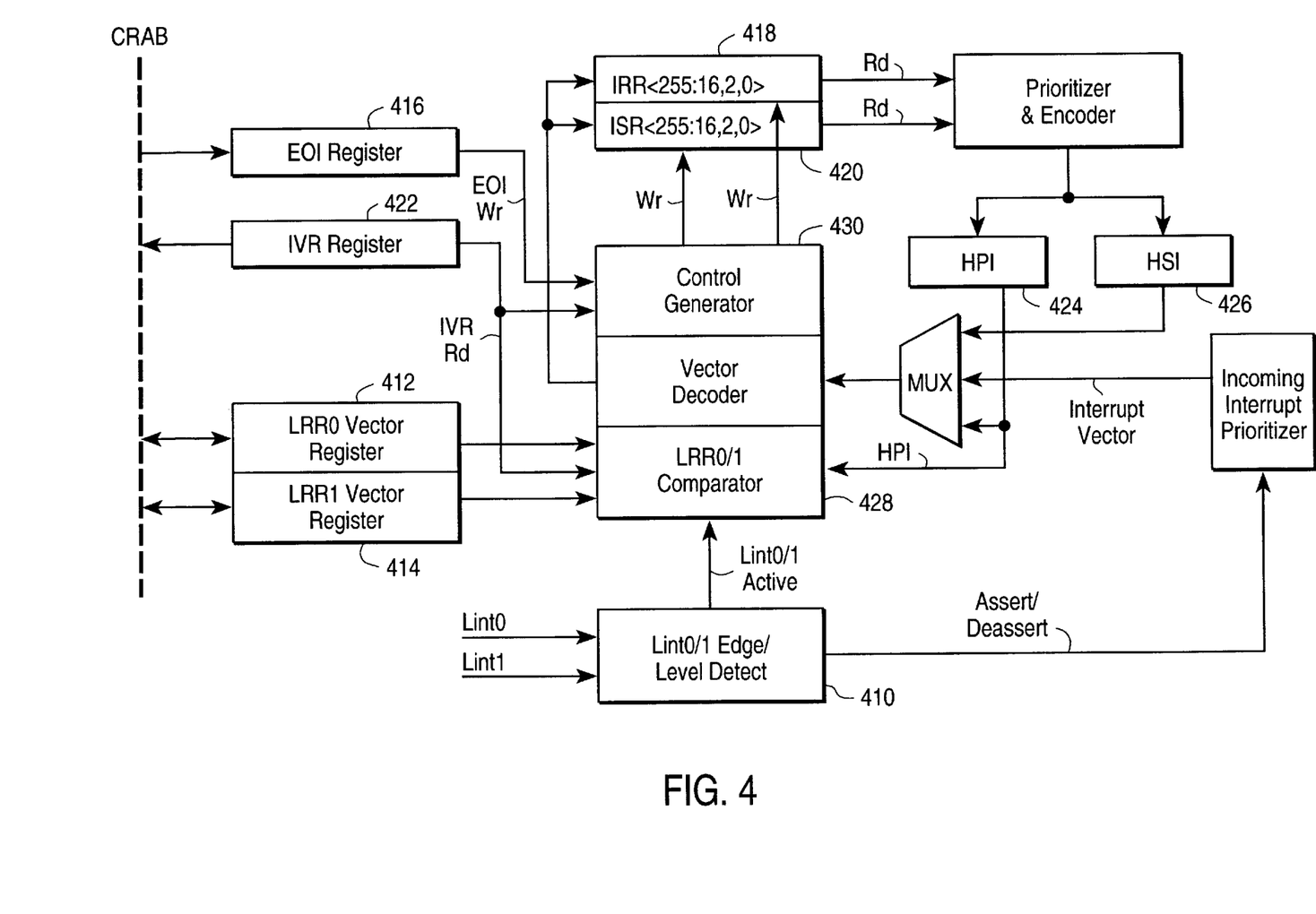

In a particular embodiment of the present invention, both the Interrupt Service Register (ISR) and the Interrupt Request Register (IRR) are accessible on an Interrupt Vector Register (IVR) read, but not on an End of Interrupt (EOI) register write. FIG. 4 illustrates that embodiment, and the logic flow for that embodiment, illustrated in FIG. 5, is the logic flow on an Interrupt Vector Register (IVR) read. The FIG. 4 embodiment differs from the FIG. 2 embodiment in certain aspects. For example: the IVR register rather than the EOI register is coupled to the comparator; and the HPI register rather than the HSI register is coupled to the comparator.

Referring now to FIG. 5, the diamond-shaped boxes 520, 530, and 540 are decisions made, and the rectangular boxes 510, 550, and 560 are tasks undertaken, on an IVR read. An interrupt has been received, and the bit corresponding to that interrupt in the Interrupt Request Register (IRR) has been set to indicate it is an interrupt source needing service. The bit contained in the Interrupt Service Register (ISR) corresponding to that interrupt had previously been cleared and has not as yet been set.

On the Interrupt Vector Register (IVR) read, the controller must decide whether the IRR bit associated with the highest priority pending interrupt should be cleared or not. For a level-triggered interrupt, for example, one associated with the local interrupt pin 0, the IRR bit should be cleared if all interrupts associated with that pin have been serviced, and should remain set if all such interrupts have not been serviced. For an edge-triggered interrupt, for example, one of the various interrupts 110 illustrated in FIG. 1 other than LINT0 and LINT1, the IRR bit should be cleared. The logic flow illustrated in FIG. 5 accomplishes these tasks efficiently and rapidly.

In the illustrated embodiment, level-triggered interrupts may occur on the interrupt lines associated with LINT0 and LINT1, but not on any other interrupt line. Therefore, according to one embodiment of the present invention, the vector corresponding to the highest priority Interrupt Request Register (IRR) bit—which is the IRR bit for the interrupt now to be serviced—is compared with the vector associated with LINT0, and is also compared with the vector associated with LINT1 (rectangular box 510). The decision of box 520 is then made: Is there a match between the vector corresponding to the highest priority IRR bit and either the vector associated with LINT0 or the vector associated with LINT1? If not, the IRR bit is cleared (rectangular box 550) and the ISR bit is set (rectangular box 560).

If, on the other hand, there is a match, for example, with the vector associated with LINT0, then it must be determined whether LINT0 was programmed to be a level-triggered interrupt. This information is contained in bit 15 of the local redirection register for LINT0, that is, in bit 15 of LRR0, the register 212 of FIG. 2. If not, the IRR bit is cleared (rectangular box 550) and the ISR bit is set (rectangular box 560).

If LINT0 was programmed to be a level-triggered interrupt, then it must be determined whether the level-status on the interrupt line associated with the LINT0 is active or not-active (diamond-shaped box 540). If the level-status is not-active, then the IRR bit is cleared (rectangular box 550), and the ISR bit is set (rectangular box 560). If the level-status is active, then the ISR bit is set (rectangular box 560), and the IRR bit is left set.

In this embodiment, the LRR0/1 comparator 428 illustrated in FIG. 4, carries out the comparison step of the rectangular box 510 illustrated in FIG. 5. The comparator 428 receives: information about the Highest Pending Interrupt (HPI) from the register 424 illustrated in FIG. 4, which is the vector number for the interrupt that is now to be serviced; input from the registers 412 and 414 regarding the pending interrupts associated with local interrupt pin 0 and with local interrupt pin 1; and input from the detector 410 regarding the level-status of local interrupt pin 0 and of local interrupt pin 1.

The comparator 428, in cooperation with a control generator 430, selectively writes to the Interrupt Request Register (IRR) 418, and to the Interrupt Service Register (ISR) 420 (rectangular boxes 550 and 560, respectively, of FIG. 5), as dictated by the method illustrated in FIG. 5.

Thus, according to this aspect of the present invention, if the Highest Pending Interrupt (HPI), that is, the interrupt that is now to be serviced, has the same vector number as a pending interrupt associated with either LINT0 or LINT1 (which can be found in the LRR0/1 registers), it is considered to be a match. If that matched pending interrupt is programmed to be level-triggered (which can be found in bit 15 of the LRR0/1 registers), and if the pin associated with that matched pending interrupt has a level-status of active, then the Interrupt Request Register (IRR) bit associated with the local interrupt pin having the matching vector is not cleared. It is not cleared even though the Interrupt Service Register (ISR) bit associated with that pin is set.

At the end of the interrupt processing in this embodiment, software does a write to the End of Interrupt (EOI) register, which clears the highest priority Interrupt Service Register (ISR) bit, indicating that service for that interrupt has been completed.

For a level-triggered interrupt in this embodiment, the Interrupt Request Register (IRR) bit is cleared only when a level de-assert message is received. The level de-assert message is occasioned by the edge detector 410 of FIG. 4 detecting the particular LINT0 or LINT1 pin going from high to low.

In still another embodiment of the present invention, a separate End of Interrupt register is included for each of LINT0 and LINT1. While this minimizes the control logic needed, it adds storage space for the now three EOI registers.

In yet another embodiment of the present invention, a single End of Interrupt register is included which is common to both LINT0 and LINT1. This embodiment, in addition to requiring an additional EOI register, also requires passing a parameter to identify if the End of Interrupt register write is for LINT0 or for LINT1.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for handling both a level-triggered interrupt and an edge-triggered interrupt on an interrupt line comprising:

determining if an interrupt on the interrupt line corresponds to an interrupt being handled;

determining whether the interrupt on the interrupt line is a level-triggered interrupt or an edge-triggered interrupt, if the interrupt on the interrupt line corresponds to the interrupt being handled;

determining whether the level-status of the interrupt line is active, if the interrupt on the interrupt line is determined to be level-triggered; and servicing a next level-triggered interrupt on the interrupt line as a valid interrupt, if the interrupt line is active.

2. The method of claim 1, wherein the interrupt being handled is a highest priority pending interrupt waiting to be serviced.

3. The method of claim 1, wherein the interrupt being handled is a pending interrupt currently being serviced.

4. A method for handling interrupts on an interrupt line capable of having both edge-triggered and level-triggered interrupts comprising:

comparing a vector corresponding to an interrupt being handled to an interrupt vector associated with an interrupt input; and servicing the interrupt line for a valid interrupt if the vectors match and type of interrupt present on the interrupt line is identified as an active pending level-triggered interrupt.

5. The method of claim 4 wherein the said servicing the interrupt line includes determining whether a pending interrupt matches the vector corresponding to the interrupt input.

6. The method of claim 5 wherein the servicing the interrupt line includes clearing an interrupt request register bit associated with the pending interrupt, if the interrupt line is indicated as having pending an edge-triggered interrupt or if the interrupt line is indicated as having pending a level-triggered interrupt line, but the interrupt line is not active.

7. The method of claim 6 further includes clearing the interrupt request register bit associated with the pending interrupt if no match results when the vectors are compared.

8. The method of claim 7 wherein the pending interrupt is an interrupt currently being serviced.

9. The method of claim 8 wherein when the pending interrupt being serviced is compared to the interrupt present on the interrupt line and the interrupt line indicates an active level-triggered interrupt is present, clearing an instruction service register to process the interrupt on the input line.

10. The method of claim 7 wherein the pending interrupt is a highest priority pending interrupt waiting to be serviced.

11. The method of claim 10 wherein when the highest priority pending interrupt waiting for service is compared to the interrupt present on the interrupt line and the interrupt line indicates an active level-triggered interrupt is present, setting an instruction service register to process the interrupt on the input line.

12. An apparatus for handling both a level-triggered interrupt and an edge-triggered interrupt on an interrupt line comprising:

an interrupt vector register for storing a vector of an incoming interrupt;

an interrupt service register for having therein an indication of a pending interrupt currently being serviced;

an interrupt request register for having therein an indication of a pending interrupt waiting to be serviced;

an edge detector for detecting whether an incoming interrupt is edge-triggered or level-triggered;

a comparator coupled to said interrupt vector register, edge detector and one of said registers having the pending interrupt indication residing therein, and for comparing the vector of the incoming interrupt in said interrupt vector register to one of said registers having the pending interrupt indication;

said comparator generating a signal if there is a match in the comparison and if said edge detector detects the incoming interrupt to be level-triggered and active; and a control generator, coupled to the comparator, for receiving the signal from said comparator and controlling said interrupt request and interrupt service registers to continue receiving interrupt input on the interrupt line, if the incoming interrupt is level-triggered and still active.

13. The apparatus of claim 12 wherein an indication of the currently serviced interrupt is used in the vector comparison.

14. The apparatus of claim 12 wherein an indication of the pending interrupt to be service is an indication of a highest priority pending interrupt waiting to be serviced, which is used in the vector comparison.

15. The apparatus of claim 12, wherein said interrupt vector register stores a vector number and wherein said comparator is operable to compare the vector number to the pending interrupt vector indicated by one of said registers having the pending interrupt indication.

16. An interrupt controller for handling a presence of a level-triggered interrupt or an edge-triggered interrupt on an interrupt line, but in which multiple level-triggered interrupts may be present comprising:

an interrupt vector register for storing a vector of an incoming interrupt an interrupt service register for having therein an indication of a pending interrupt currently being serviced;

an interrupt request register for having therein an indication of a pending interrupt waiting to be serviced;

an edge detector for detecting whether an incoming interrupt is edge-triggered or level-triggered;

a comparator coupled to said interrupt vector register, edge detector and one of said registers having the pending interrupt indication residing therein, and for comparing the vector of the incoming interrupt in said interrupt vector register to one of said registers having the pending interrupt indication;

said comparator generating a signal if there is a match in the comparison and if said edge detector detects the incoming interrupt to be level-triggered and active; and a control generator, coupled to the comparator, for receiving the signal from said comparator and controlling said interrupt request and interrupt service registers to continue receiving interrupt input on the interrupt line, if the incoming interrupt is level-triggered and still active.

17. The interrupt controller of claim 16 wherein an indication of the currently serviced interrupt is used in the vector comparison.

18. The interrupt controller of claim 17 further including a plurality of local interrupt pins, each of the pins being operable to having an interrupt source coupled to it to receive both edge-triggered and level-triggered interrupts.

19. The interrupt controller of claim 16 wherein an indication of the pending interrupt to be service is an indication of a highest priority pending interrupt waiting to be serviced, which is used in the vector comparison.

20. The interrupt controller of claim 19 further including a plurality of local interrupt pins, each of the pins being operable to having an interrupt source coupled to it to receive both edge-triggered and level-triggered interrupts.

21. The interrupt controller of claim 16, wherein said interrupt vector register stores a vector number and wherein said comparator is operable to compare the vector number to the pending interrupt vector indicated by one of said registers having the pending interrupt indication.

* * * * *

UNITED STATES PATENT AND TRADEMARK OFFICE
CERTIFICATE OF CORRECTION

PATENT NO.     : 6,021,458
DATED          : February 1, 2000
INVENTOR(S)    : Jayakumar et al.

It is certified that error appears in the above-identified patent and that said Letters Patent is hereby corrected as shown below:

Column 4,
Line 46, delete "EMBODIMENT" and insert -- EMBODIMENTS --.

Column 6,
Line 34, insert -- if --, before "higher".

Signed and Sealed this

Second Day of December, 2003

JAMES E. ROGAN
*Director of the United States Patent and Trademark Office*